United States Patent [19]

Mori

[11] Patent Number: 4,921,184
[45] Date of Patent: May 1, 1990

[54] LOCKING MECHANISM FOR WEBBING RETRACTOR

[75] Inventor: Shinji Mori, Niwa, Japan

[73] Assignee: Kabushiki Kaisha Tokai-Rika-Denki-Susakusho, Aichi, Japan

[21] Appl. No.: 329,934

[22] Filed: Mar. 28, 1989

[30] Foreign Application Priority Data

Mar. 31, 1988 [JP] Japan ............................ 63-44158[U]

[51] Int. Cl.⁵ ..................... A62B 35/00; B65H 75/48
[52] U.S. Cl. ............................................. 242/107.4 A
[58] Field of Search ............... 242/107.4 R, 107.4 A, 242/107.4 B; 297/388; 280/806, 807

[56] References Cited

U.S. PATENT DOCUMENTS

| | | | |
|---|---|---|---|
| 3,831,878 | 8/1974 | Griffin | 242/107.4 A |
| 3,937,416 | 2/1976 | Henderson | 242/107.4 A |
| 3,944,162 | 3/1976 | Henderson | 242/107.4 A |
| 3,990,651 | 11/1976 | Romanzi et al. | 242/107.4 A |
| 4,015,796 | 4/1977 | Higbee | 242/107.4 A |
| 4,220,294 | 9/1980 | DiPaola | 242/107.4 A |

Primary Examiner—Donald Watkins
Attorney, Agent, or Firm—Oliff & Berridge

[57] ABSTRACT

A locking mechanism for looking a winding shaft wound a webbing to prevent the winding shaft from rotating at excessive movement more than a predetermined amount of acceleration in a horizontal direction. The locking mechanism has an operating member which is inclined at the excessive movement more than the predetermined amount of acceleration in the horizontal direction to lock the winding shaft. The operating body has a pair of plate-like inertia portions extended symmetrically with respect to the axis of the winding shaft in the direction to approach an outer periphery of the webbing wound around the winding shaft. The operating body is inclined by the inertia portions when the acceleration is exerted. Thus, the locking mechanism locks the winding shaft by means of these inertia portions and the locking mechanism can be made small in the vertical direction.

18 Claims, 6 Drawing Sheets

LOCKING MECHANISM FOR WEBBING RETRACTOR

BACKGROUND OF THE INVENTION

1. Field of the Invention

The present invention relates to a locking mechanism of a webbing retractor which has a winding shaft around which a webbing is wound in the form of layers. The locking mechanism is capable to prevent from rotating the winding shaft at excessive movement more than a predetermined amount of acceleration in a horizontal direction of a vehicle.

2. Description of the Related Art

A seat belt apparatus for a vehicle is provided with a webbing retractor which accommodates a webbing for restricting movement of a seat occupant by resiliently winding in a laminating condition the webbing around a winding shaft to which one end of the webbing is fixed. The seat occupant draws the webbing out of this webbing retractor when he puts it on.

The webbing retractor has a locking mechanism for preventing the rotation of the winding shaft when the running speed of the vehicle rapidly drops to prevent the unwinding of the webbing and to thereby restrict the movement of the seat occupant.

Figure 6:
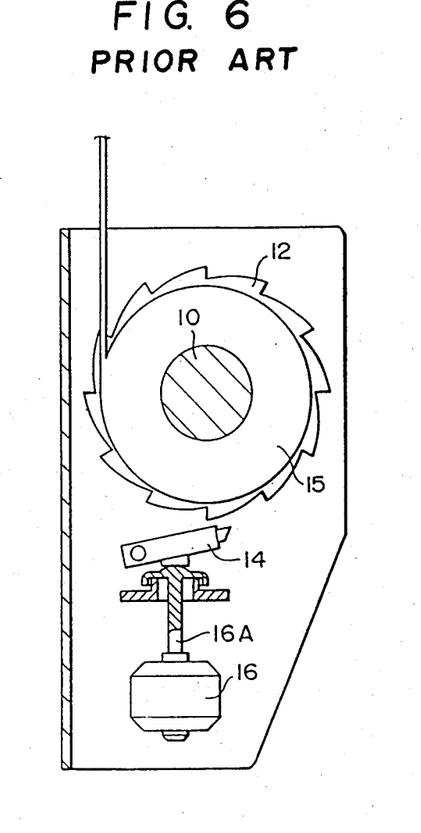
FIG. 6 is a cross-sectional view of a conventional locking mechanism for a webbing retractor.

FIG. 6 shows a conventional locking mechanism a type described above. In this locking mechanism, rotation of the winding shaft 10 is prevented when ratchet wheels 12 which are fixedly mounted on the winding shaft 10 are engaged with a pawl 14. A pendulum 16 is connected to this pawl 14 near a laminated portion 15 of the webbing. The pawl 14 is engaged with the ratchet wheels 12 by the swing of the pendulum 16. The pendulum 16 swings when a predetermined amount of acceleration acts in a horizontal direction of a vehicle or in a widthwise direction shown in FIG. 6, that is, when the running speed of the vehicle rapidly drops, and thereby causes the pawl 14 to be meshed with the ratchet wheels 12 so as to prevent from rotating the winding shaft 10.

However, in this locking mechanism, the pendulum 16 requires a long rod 16A, and this makes the locking mechanism long in a vertical direction (in a lengthwise direction shown in FIG. 6), which in turn makes a resultant webbing retractor elongated in the vertical direction.

SUMMARY OF THE INVENTION

In view of the aforementioned problem of the related art, an object of the present invention is to provide a locking mechanism for a webbing retractor which does not make the webbing retractor elongated in a vertical direction.

To this end, the present invention provides a locking mechanism for use in a webbing retractor of the type which has a winding shaft around which a webbing is wound in the form of layers, the locking mechanism preventing rotation of the winding shaft at excessive movement more than a predetermined amount of acceleration in a horizontal direction. The locking mechanism of the present invention includes: a locking wheel rotated together with a winding shaft; a locking pawl that can be engaged with the locking wheel to prevent from rotating the winding shaft; and an operating body for bringing a locking pawl into engagement with the locking wheel at excessive movement more than the predetermined amount of acceleration in a horizontal direction. The operating body has a first portion which brings the locking pawl into engagement with the locking wheel when it is slanted, and a pair of second portions extending from the first portion symmetrically with respect to an axis of the winding shaft and in the direction in which they approach an outer periphery of the webbing wound around the winding shaft. The second portions make the first portion inclined when the predetermined amount of acceleration acts in a horizontal direction.

In the present invention, when the predetermined amount of acceleration acts excessively in the horizontal direction, the second portions of the operating body make the first portion inclined, and this allows the locking pawl to be engaged with the locking wheel. The locking pawl which is engaged with the locking wheel prevents from rotating the winding shaft. Thus, rotation of the winding shaft is prevented when the predetermined amount of acceleration acts excessively in the horizontal direction.

The second portions of the operating body are extended in a direction in which they approach an outer periphery of the wound webbing. This allows a resultant webbing retractor to be made small in the vertical direction of the vehicle.

DETAILED DESCRIPTION OF THE PREFERRED EMBODIMENTS

Figure 1:
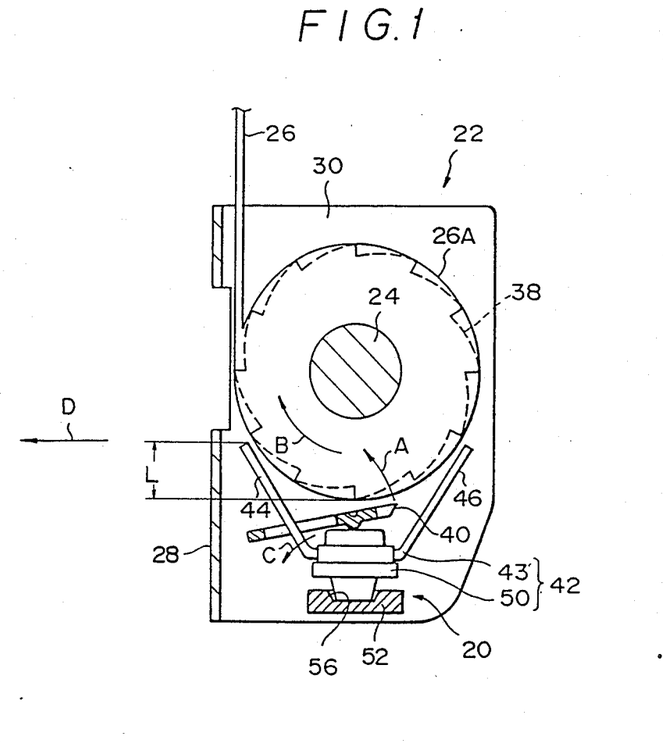
FIG. 1 is a cross-sectional view of a locking mechanism of a webbing retractor, showing a first embodiment of the present invention.
Figure 2:
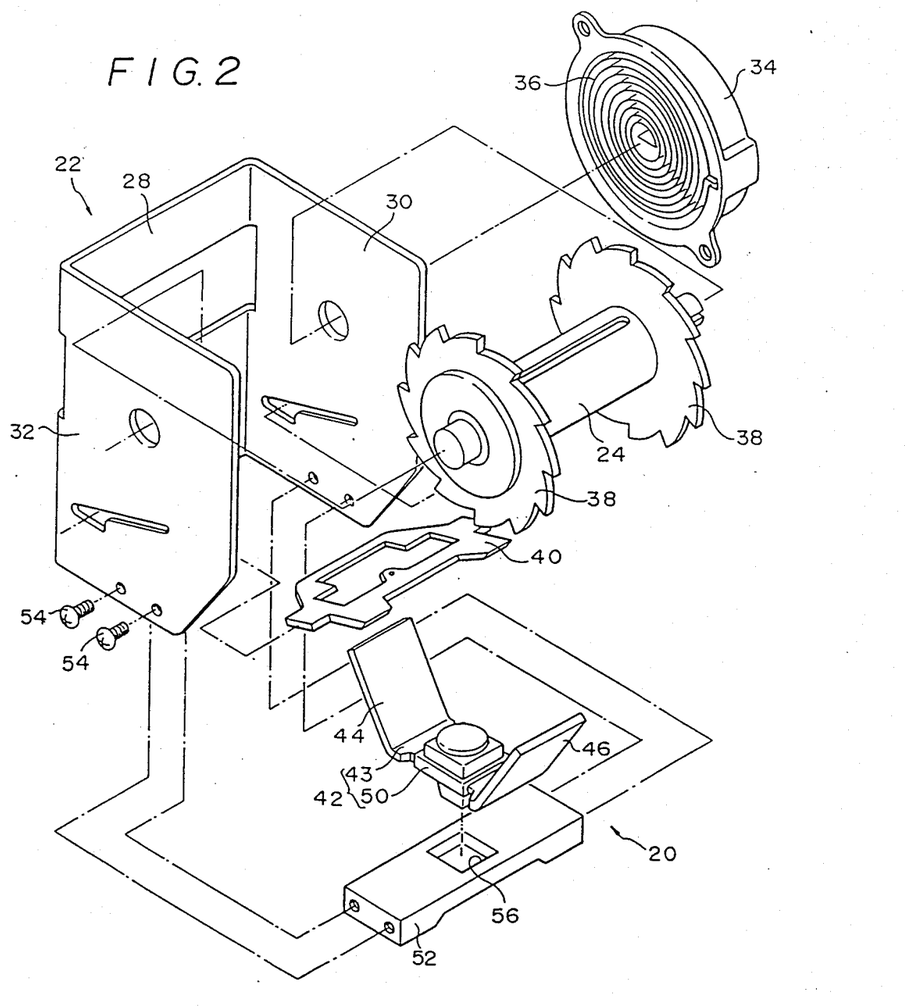
FIG. 2 is an exploded perspective view of the essential parts of the locking mechanism shown FIG. 1.
Figure 3:
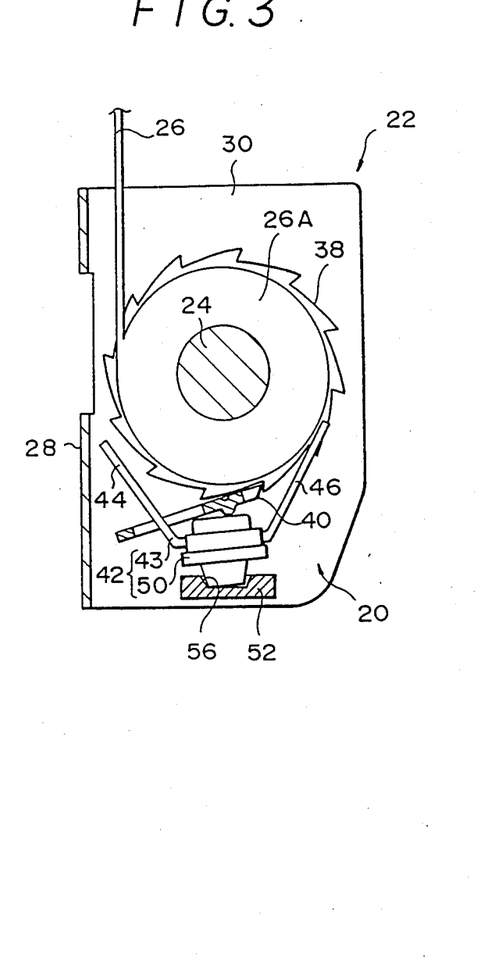
FIG. 3 shows a condition of an operation of the locking mechanism of FIG. 1.

FIGS. 1 to 3 shows a webbing retractor 22 for a seat belt apparatus which has a locking mechanism 20 of the present invention.

As shown in FIG. 1, the webbing retractor 22 includes a winding shaft 24 around which a webbing 26 for restricting the movement of a seat occupant is wound in a laminating manner. The winding shaft 24 is supported by a frame 28 in such a manner that it extends substantially in a horizontal direction. More specifically, the winding shaft 24 is rotatably supported at the two ends thereof by leg plates 30 and 32 of the frame 28, which are disposed parallel to each other as shown in FIG. 2. A spring cover 34 with a flat spiral spring 36 accommodated therein is mounted on the leg plate 30 of the frame 28. The external end of the spiral spring 36 is locked to the spring cover 34, and the internal end thereof is locked to the one end portion of the winding shaft 24. This allows the spiral spring 36 to urge and rotate the winding shaft 24. The webbing 26 is wound around the winding shaft 24 utilizing this urging force and is thereby accommodated in the webbing retractor. When a seat occupant puts on this webbing 26, he unwinds it from the winding shaft 24 against the urging force.

The locking mechanism includes a ratchet wheel 38 which is a locking wheel, a pawl 40 which serves as a locking pawl, and an operating body 42.

The ratchet wheel 38 is provided in a pair as shown in FIG. 2. The ratchet wheels 38 are coaxially fixed to the winding shaft 24 between the leg plates 30 and 32 at the two sides of a laminated portion 26A of the webbing 26, so that they can be rotated together with the winding shaft 24 when the shaft is rotated.

The pawl 40 is disposed below the laminated portion 26A of the webbing 26. The pawl 40 is extended between the leg plates 30 and 32 of the frame 28 in such a manner as to be pivotal in the direction indicated by an arrow head A in FIG. 1. The pawl 40 becomes engaged with the ratchet wheels 38 when it is lifted upward, by which rotation of the winding shaft 24 in a direction indicated by an arrowhead B in FIG. 1 can be prevented so as to prevent drawing of the webbing.

The operating body 42 has a square portion 50 which serves as an inclined portion or a contact portion, and an inertia plate 43 that constitutes an inertia portion.

The square portion 50 is supported on the frame 28 below the pawl 40 in such a manner that it can be inclined with respect to the frame 28. More specifically, a supporting block 52 is mounted on the frame 28 below the pawl 40, and the square portion 50 is supported by this supporting block 52. The supporting block 52 is fixed to the two leg plates 30 and 32 by means of vises 54 as shown in FIG. 2, and is thereby extended between the leg plates 30 and 32. The supporting block 52 has a square hole 56 having a bottom formed on the upper surface thereof as shown in FIG. 2, and the lower end portion of the square portion 50 is received by this square hole 56. Since the square portion 50 is inserted in the square hole 56, the square portion is prevented from rotating around its axis. The square hole 56 has a size that enables the square portion 50 to be inclined in a direction indicated by an arrowhead C in FIG. 1. Thus, the square portion 50 is supported on the frame 28 in such a manner that it can become inclined with respect to the frame 28.

The lower surface of the pawl 40 is in contact with the upper surface of the square portion 50, as shown in FIG. 2. When the square portion 50 is inclined in the direction indicated by an arrowhead C in FIG. 1, it raises the pawl 40 and thereby brings it into engagement with the ratchet wheels 38.

The inertia plate 43 is extended below the laminated portion 26A of the webbing 26 in a direction in which it intersects the axis of the winding shaft 24. The intermediate portions of the extended portions of the inertia plate 43 are bent to form vane portions 44 and 46 that extend in a direction of the tangent of the laminated portion 26A at the two end portions of the extended portions. The vane portions 44 and 46 serve as the inertia portions. The portion of the inertia plate 43 located between the vane portions 44 and 46 is positioned below the pawl 40. The vane portions 44 and 46 are extended above the pawl 40 with the vane portion 44 being passed through the pawl 40. As viewed from a size portion, the vane portions 44 and 46 overlap the laminated portion 26A of the accommodated webbing 26 as shown in FIG. 1 by a predetermined length (L) in the vertical direction or in the lengthwise direction as viewed in FIG. 1. As viewed from above, the vane portions 44 and 46 do not protrude from the laminated portion 26A. Thus, the inertia plate 43 is disposed as if it surrounds the laminated portion 26A.

The portion of the inertia plate 43 located between the vane portions 44 and 46 is formed integrally with the square portion 50 so that it causes the square portion 50 to become inclined in a direction indicated by the arrowhead C when more than a predetermined amount of horizontal acceleration is exerted in the direction indicated by a arrowhead D in FIG. 1 in a state where the webbing is fastened around the seat occupant. More specifically, in a state where the webbing is fastened around the seat occupant, since the webbing 26 has been drawn out, the diameter of the laminated portion 26A of the webbing is decreased. As a result, a relatively large space is generated between the laminated portion 26A of the webbing 26 and the vane portions 44 and 46, and the square portion 50 can be inclined in the direction indicated by the arrowhead C to occupy this space at the excessive movement more than a predetermined amount of horizontal acceleration in the direction indicated by the arrowhead D.

Next, the operation of the locking mechanism will be described as follows.

FIG. 1 shows a webbing retractor with a webbing accommodated therein. In this state, the pawl 40 is separated from the ratchet wheels 38, and this enables a seat occupant to unwind the webbing 26 from the winding shaft 24 against the urging force of the spiral spring 36 and to put it on.

In a state where the webbing is fastened around the seat occupant, since the webbing 26 has been drawn out from the winding shaft 24, the diameter of the laminated portion 26A of the webbing is decreased. As a result, a relatively large space is generated between the laminated portion 26A of the webbing 26 and the vane portions 44 and 46 of the inertia plate 43, and the square portion 50 can be inclined in the direction indicated by the arrowhead C in FIG. 1 by the inertia plate 43 to occupy this space.

Thus, when the predetermined amount of horizontal acceleration is excessively exerted in the direction indicated by the arrowhead D, e.g., when the running speed of a vehicle rapidly drops, the square portion 50 is inclined by the inertia plate 43 in the direction indicated by the arrowhead C, raising the pawl 40 and thereby bringing it into engagement with the ratchet wheels 38 as shown in FIG. 3, and preventing from rotating the winding shaft 10 in the direction indicated by the arrowhead B in FIG. 1. Thus, the drawing of the webbing 26 is suspended, and movement of the seat occupant is thereby restricted by the webbing 26.

The inertia plate 43 of the locking mechanism 20, in particular, the vane portions 44 and 46 thereof, overlap the laminated portion 26A of the accommodated webbing 26 shown in FIG. 1 in the vertical direction or in the lengthwise direction as shown in FIG. 1, as if they surround the laminated portion 26A of the webbing 26. Consequently, the inertia plate 43 does not downward protrude so much from the laminated portion 26A. Furthermore, since the vane portions 44 and 46 are operated in the space generated when the diameter of the laminated portion 26A is changed, which is caused by the webbing being drawn out by the seat occupant, it is not necessary to provide a large space around the laminated portion 26A of the webbing 26 where the vane portions are operated.

Consequently, the frame 28 of the webbing winding device 22 can be made small in the vertical direction or in the lengthwise direction as viewed in FIGS. 1 and 3 to make the overall size of the webbing winding device 22 in small.

In this embodiment, since the square portion 50 is received by the square hole 56 formed in the supporting block 52 so that it does not rotate around its own axis, rolling of the inertia plate 43 is prevented, thereby preventing the inertia plate from interfering with other components. Further, this structure allows vibrations to be damped effectively.

Figure 4:
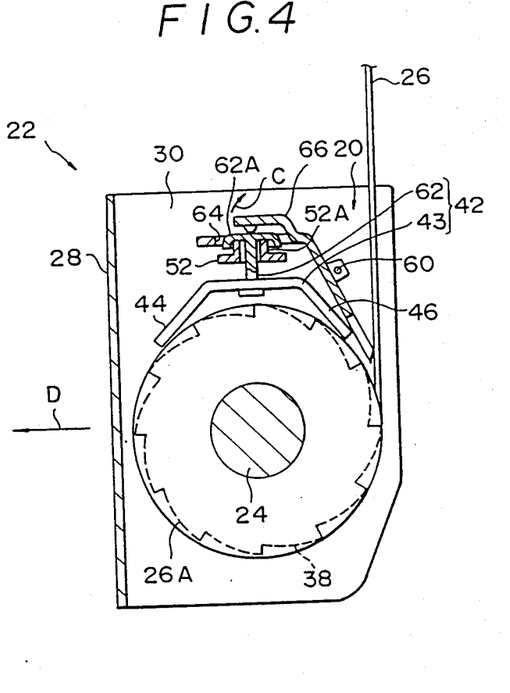
FIG. 4 is a cross-sectional view of a locking mechanism of a webbing retractor for a second embodiment of the present invention.
Figure 5:
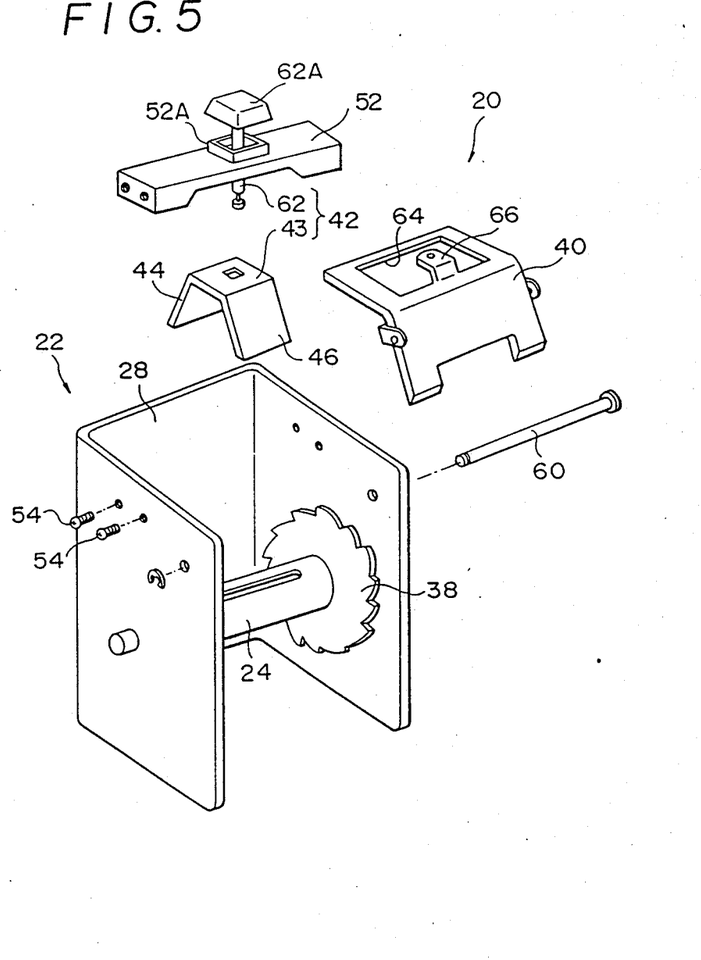
FIG. 5 is an exploded perspective view of essential parts of the locking mechanism shown FIG. 4.

FIGS. 4 and 5 show a second embodiment of the present invention. In the locking mechanism of the second embodiment, the pawl 40, the operating body 42 and the supporting block 52 are disposed above the laminated portion 26A of the webbing 26, and the operating body 42 has the inertia plate 43 and a supporting rod 62 which acts as an inclined portion, as shown in FIG. 4.

The pawl 40 is bent so that it has substantially an L-shaped form as shown in FIG. 5. The pawl 40 is pivotaly supported on the leg plates 30 and 32 of the frame 28 by means of a pin 60 at the vicinity of the bent portion thereof. This allows the pawl 40 to be engaged with the ratchet wheels 38 when the end portion thereof remote from the portion that faces the ratchet wheels 38 is raised.

One end of the supporting rod 62 is fitted into the portion of the inertia plate 43 located between the vane portions 44 and 46. Below the end portion of the pawl 40 remote from the portion thereof that engages with the ratchet wheels 38, the inertia plate 43 hangs from the supporting block 52 through the supporting rod 62 in such a manner that it surrounds the laminated portion 26A of the webbing 26. The forward ends of the vane portions 44 and 46 overlap the laminated portion 26A of the accommodated webbing 26 shown in FIG. 4 in the vertical portion or in the lengthwise direction as viewed in FIG. 4.

The supporting rod 62 has a square unbrella portion 62A formed at the portion thereof at which it is supported to the supporting block 52. The unbrella portion 62A is inserted by an inserting hole 64 formed in the portion of the pawl 40 which is remote from the portion thereof which is engaged with the ratchet wheels 38. A lug 66 protrudes upward into the inserting hole 64. The lug 66 is in contact with the upper surface of the unbrella portion 62A.

The supporting block 52 has a cylindrical square portion 52A at the portion thereof which faces the unbrella portion 62A of the supporting rod 62. The cylindrical square portion 52A is inserted within the unbrella portion 62A, by which the supporting rod 62 is prevented from being rotated around its own axis.

In consequence, when a predetermined amount of acceleration is excessively exerted in the direction indicated by the arrowhead D in FIG. 4 in the state where the webbing 26 is drawn out and is worn by a seat occupant, the unbrella portion 62A of the supporting rod 62 is inclined by the inertia plate 43 in the direction indicated by the arrowhead C in FIG. 4 to raise the pawl 40 and thereby to bring it into engagement with the ratchet wheels 38.

In this second embodiment, the vane portions 44 and 46 overlap the laminated portion 26A of the accommodated webbing 26 as shown in FIG. 4 in the vertical direction or in the lengthwise direction as viewed in FIG. 4, as described in the first embodiment. In consequence, the frame 28 of the webbing retractor 22 can be made small in the vertical direction or in the lengthwise direction as viewed in FIG. 4, and the overall size of the webbing retractor 22 can thereby be maintained small.

Furthermore, since the cylindrical square portion 52A of the supporting block 52 is inserted into the unbrella portion 62A of the supporting rod 62 so as to prevent the supporting rod 62 from being rotated about it own axis, rolling of the inertia plate 43 can be prevented, thereby preventing it from interfering with other components. Further, the above-described structure enables vibrations to be damped effectively.

What is claimed is:

1. A locking mechanism of a webbing retractor having a winding shaft to wind a webbing in a laminated manner thereon, said locking mechanism being capable of preventing from rotating said winding shaft at excessive movement more than a predetermined amount of acceleration in a horizontal direction, comprising:
   a locking wheel rotated together with said winding shaft;
   a locking pawl being engagable with said locking wheel to prevent said winding shaft from rotating; and
   an operating body for bringing said locking pawl into engagement with said locking wheel at the excessive movement more than said predetermined amount of acceleration in the horizontal direction, said operating body having a first portion to bring said locking pawl into engagement with said locking wheel when inclined, and a pair of second portions extending from said first portion symmetrically with respect to the axis of said winding shaft and in a direction for approaching an outer periphery of the webbing wound around said winding shaft, said second portions causing said first portion to become inclined at the excessive movement more than said predetermined amount of acceleration in the horizontal direction.

2. A locking mechanism according to claim 1, wherein said second portions have a plate-like form whose width lies in the direction substantially parallel to the axis of said winding shaft.

3. A locking mechanism according to claim 1, wherein said first portion can be inclined in a direction substantially perpendicular to the axis of said winding shaft.

4. A locking mechanism according to claim 1, wherein said operating body is supported below said winding shaft on a frame which rotatably supports said winding shaft.

5. A locking mechanism according to claim 4, wherein said operating body is placed on a supporting member disposed below said winding shaft.

6. A locking mechanism according to claim 5, wherein said pair of second portions are extended from said first portion substantially in a "V" shape.

7. A locking mechanism according to claim 6, wherein said supporting member has a square hole having a bottom while said first portion has a square portion, and wherein said square portion is loosely fitted into said square hole, by which means said operating body is prevented from bing rotated on said supporting member about said first member.

8. A locking mechanism according to claim 1, wherein said operating body is supported above said winding shaft on a frame that rotatably supports said winding shaft.

9. A locking mechanism according to claim 8, wherein said first portion hangs from a supporting member disposed above said winding shaft.

10. A locking mechansim according to claim 9, wherein said second portions are extended from the lower end portion of said first portion substantially in an inverted "V" shape.

11. A locking mechanism according to claim 10, wherein a square umbrella portion is formed at the upper end of said first portion while a square cylindrical portion is provided on said supporting member, and wherein said first member passes through said square cylindrical portion while part of said square cylindrical portion is accommodated within said umbrella portion so as to prevent said first member from rotating about said umbrella portion.

12. A locking mechansim of a webbing retractor having a winding shaft to wind a webbing in a laminated manner by a seat occupant, said locking mechanism being capable of preventing rotation of said winding shaft in a direction to draw out said webbing at excessive movement more than a predetermined amount of acceleration in a longitudinal direction of a vehicle, comprising:
ratchet wheels supported on said winding shaft in such a manner as to be rotatable together with said winding shaft;
a pawl that being engagable with said ratchet wheels to prevent said winding shaft from rotating in a direction in which said webbing is drawn out; and
an operating body inclined in the longitudinal direction of said vehicle at excessive movement more than said predetermined acceleration in the longitudinal direction of said vehicle to bring said pawl into engagement with said ratchet wheels, said operating body having an inclined portion and a pair of plate-like inertia portions, said inclined portion being in contact with said pawl, said inclined portion being able to become inclined in the longitudinal direction of said vehicle, said inclined portion bringing said pawl into engagement with said ratchet wheels when it is inclined, said inertia portions extending from said inclined portion symmetrically with respect to the axis of said winding portion and in the direction in which they approach an outer periphery of said webbing wound around said winding shaft, and said inertia portions causing said inclined portion to become inclined when more than said predetermined amount of acceleration is exerted in the longitudinal direction of said vehicle.

13. A locking mechanism according to claim 12, wherein said inclined portion is disposed below said winding shaft, and wherein said inertia portions are extended from said inclined portion substantially in a "V" shape.

14. A locking mechanism according to claim 13, wherein said inclined portion is placed on a supporting member disposed below said winding shaft.

15. A locking mechanism according to claim 14, wherein said supporting member has a square hole having a bottom while said inclined portion has a square portion, and wherein said square portion is loosely fitted into said square hole to prevent said operating body from rotating rotated on said supporting member about said square portion.

16. A locking mechanism according to claim 12, wherein said inclined portion is disposed above said winding shaft, and wherein said inertia portions are extended from said inclined portion substantially in an inverted "V" shape.

17. A locking mechanism according to claim 16, wherein said inclined portion hangs from a supporting member disposed above said winding shaft.

18. A locking mechanism according to claim 17, wherein a square unbrella portion is formed at the upper end of said inclined portion while a square cylindrical portion is provided on said supporting member through which said inclined portion passes, and wherein the upper end of said square cylindrical portion is accommodated within said umbrella portion so as to prevent said inclined portion from rotating about a perpendicular.

* * * * *